United States Patent
Rorex et al.

(10) Patent No.: US 6,876,997 B1
(45) Date of Patent: Apr. 5, 2005

(54) METHOD AND APPARATUS FOR INDENTIFYING RELATED SEARCHES IN A DATABASE SEARCH SYSTEM

(75) Inventors: Phillip G. Rorex, Stevenson Ranch, CA (US); Thomas A. Soulanille, Pasadena, CA (US); Bradley R. Haugaard, Monrovia, CA (US)

(73) Assignee: Overture Services, Inc., Pasadena, CA (US)

( * ) Notice: Subject to any disclaimer, the term of this patent is extended or adjusted under 35 U.S.C. 154(b) by 0 days.

(21) Appl. No.: 09/575,894

(22) Filed: May 22, 2000

(51) Int. Cl.[7] ............................................ G06F 17/30
(52) U.S. Cl. ........................... 707/3; 707/10; 707/101; 705/14; 705/37
(58) Field of Search ........................ 707/3–6, 10, 100, 707/101; 705/14, 37

(56) References Cited

U.S. PATENT DOCUMENTS

| | | | |
|---|---|---|---|
| 5,303,361 A | 4/1994 | Colwell et al. | |
| 5,664,111 A | 9/1997 | Nahan et al. | |
| 5,778,367 A | 7/1998 | Wesinger, Jr. et al. | ........ 707/10 |
| 5,787,421 A | 7/1998 | Nomiyama | |
| 5,794,210 A | 8/1998 | Goldhaber et al. | |
| 5,799,284 A | 8/1998 | Bourquin | |

(Continued)

FOREIGN PATENT DOCUMENTS

| | | | |
|---|---|---|---|
| EP | 0 813 158 A2 | 12/1997 | |
| EP | 0 829 811 A1 | 3/1998 | |
| WO | WO 99/05618 | 2/1999 | |
| WO | WO 99/41694 | * 8/1999 | ......... G06F/153/00 |

OTHER PUBLICATIONS

Search Report from Great Britain for corresponding patent application No. GB 02298482.5, dated Nov. 27, 2003, 3 pages.
News of The Week articles, *Telephony*, May 1, 1995, pp. 8, and 10.
Nuts 'N Bolts articles, *Target Marketing*, Oct. 1997, 1 page.
DoubleClick TestIt!, obtained at the internet address: http://web.archive.org/web/ 19980205034316 / www.doubleclick.com/nf/adinfo/testiset.htm, dated Oct. 16, 2002, 4 pages.
DoubleClick Frequently Asked Questions, obtained at the internet address: http://web.archive.org/web/19980205 033925/www.doubleclick.com/nf/adinfo/facts.htm, dated Oct. 16, 2002, 5 pages.
"New Service Puts Ad Auction, Search Engine Under One Roof", article from Electronic Advertising & Marketplace Report, *Simba Information, Inc.* Apr. 28, 1998, 2 pages.
Google Search, communication from Jeffrey Brewer at Jeffrey@goto.com, titled "Need reverse stemming software", dated May 27, 1998, obtained at the internet address: http://groups.google.com/groups?selm=356 CEE4A8DE 882A8%40goto.com, on Dec. 19, 2002, 1 page.

(Continued)

*Primary Examiner*—Srirama Channavajjala
*Assistant Examiner*—Khanh Pham
(74) *Attorney, Agent, or Firm*—Brinks Hofer Gilson & Lione

(57) ABSTRACT

A method of generating a search result list also provides related searches for use by a searcher. Search listings which generate a match with a search request submitted by the searcher are identified in a pay for placement database which includes a plurality of search listings. Related search listings contained in a related search database generated from the pay for placement database are identified as relevant to the search request. A search result list is returned to the searcher including the identified search listings and one or more of the identified search listings.

14 Claims, 7 Drawing Sheets

U.S. PATENT DOCUMENTS

| | | | |
|---|---|---|---|
| 5,802,515 A | 9/1998 | Adar et al. | |
| 5,809,144 A | 9/1998 | Sirbu et al. | |
| 5,812,996 A | 9/1998 | Rubin et al. | |
| 5,819,092 A | 10/1998 | Ferguson et al. | |
| 5,819,255 A | 10/1998 | Celis et al. | |
| 5,822,749 A | 10/1998 | Agarwal | |
| 5,826,260 A | 10/1998 | Byrd, Jr. et al. | |
| 5,826,261 A | 10/1998 | Spencer | |
| 5,842,206 A | 11/1998 | Sotomayor | |
| 5,845,278 A | 12/1998 | Kirsch et al. | |
| 5,850,442 A | 12/1998 | Muftic | |
| 5,862,223 A | 1/1999 | Walker et al. | 705/50 |
| 5,864,845 A | 1/1999 | Voorhees et al. | |
| 5,864,846 A | 1/1999 | Voorhees et al. | |
| 5,864,863 A | 1/1999 | Burrows | |
| 5,870,740 A | 2/1999 | Rose et al. | |
| 5,875,446 A | 2/1999 | Brown et al. | |
| 5,903,887 A | 5/1999 | Kleewein et al. | |
| 5,913,208 A * | 6/1999 | Brown et al. | 707/3 |
| 5,924,090 A | 7/1999 | Krellenstein | |
| 5,933,822 A | 8/1999 | Braden-Harder et al. | |
| 5,940,821 A | 8/1999 | Wical | |
| 5,950,189 A | 9/1999 | Cohen et al. | |
| 5,950,206 A | 9/1999 | Krause | |
| 5,953,718 A | 9/1999 | Wical | |
| 5,987,446 A | 11/1999 | Corey et al. | |
| 5,987,460 A | 11/1999 | Niwa et al. | |
| 5,999,915 A | 12/1999 | Nahan et al. | |
| 5,999,929 A * | 12/1999 | Goodman | 707/7 |
| 6,006,217 A | 12/1999 | Lumsden | |
| 6,012,053 A | 1/2000 | Pant et al. | |
| 6,016,487 A | 1/2000 | Rioux et al. | |
| 6,021,409 A | 2/2000 | Burrows | |
| 6,026,398 A | 2/2000 | Brown et al. | |
| 6,029,195 A | 2/2000 | Herz | |
| 6,032,207 A | 2/2000 | Wilson | |
| 6,078,866 A * | 6/2000 | Buck et al. | 702/2 |
| 6,081,805 A * | 6/2000 | Guha | 707/5 |
| 6,128,623 A | 10/2000 | Mattis et al. | |
| 6,154,738 A | 11/2000 | Call | |
| 6,233,575 B1 | 5/2001 | Agrawal et al. | |
| 6,247,021 B1 | 6/2001 | Himmel et al. | |
| 6,253,188 B1 | 6/2001 | Witek et al. | |
| 6,269,361 B1 | 7/2001 | Davis et al. | |
| 6,285,987 B1 | 9/2001 | Roth et al. | 705/27 |
| 6,363,377 B1 * | 3/2002 | Kravets et al. | 707/4 |
| 6,401,118 B1 * | 6/2002 | Thomas | 709/224 |
| 6,421,675 B1 * | 7/2002 | Ryan et al. | 707/100 |
| 2001/0051911 A1 * | 12/2001 | Marks et al. | 705/37 |
| 2002/0004735 A1 | 1/2002 | Gross | 705/10 |

OTHER PUBLICATIONS

Ketchpel, Steven P. et al. "U–PAI: A Universal Payment Application Interface", conference material article from the second USENIX Workshop on Electronic Commerce Proceedings, Oakland, California, Nov. 18–21, 1996, 17 pages.

Schwart, Randal L., "Click–Through Tracking in Perl", *Web Techniques,* dated May 1998, located at the internet address: www.webtechniques.com, 3 pages.

Van Roeden, Adriaan, "Your Own Search Engine With SWISH, A Custom Search Facility For Your Web Site", *Web Techniques,* dated Nov. 1996, located at the internet address: www.webtechniques.com, pp. 63–66 pages.

Full Catalog—Categories Menu, Sun Microsystems Sun Solutions Catalog, obtained at the internet address: http://web.archive.org/web/19981205110211/solutions.sun.com/catalogs/all/index.htm, printed on Dec. 19, 2002, 2 pages.

Help on Making Queries—Search by Company or Product, obtained at the internet address: http://web.archive.org/web/19981203050002/solutions.sun.com/search–help.htm, printed on Dec. 19, 2002, 4 pages.

Online Updating, Sun Microsystems Sun Solutions Catalog obtained at the internet address: http://web.archive.org/web/19990220190636/solutions.sun.com/editmodule/help.html, printed on Dec. 19, 2002, 2 pages.

Press Release article titled "GoTo.com Announces First round of Financing. Totaling More Than $6 Million, Led by Draper, Fisher Jurvetson", *Business Wire,* date May 19, 1998, printed from the Internet at <http://www.dialogclassic.com/main.vingw> on Nov. 9, 2000, 2 pages.

* cited by examiner

METHOD AND APPARATUS FOR INDENTIFYING RELATED SEARCHES IN A DATABASE SEARCH SYSTEM

APPENDIX/COPYRIGHT REFERENCE

A compact disc appendix is included containing computer program code listings pursuant to 37 C.F.R. 1.52(e) and is hereby incorporated herein in its entirety by this reference. The total number of compact discs is 1 including 58,306 bytes. The compact disc includes one file created Sep. 8, 2003 entitled "Source Code Appendix for U.S. Ser. No. 09/575,894." The compact disc appendix replaces the Source Code Appendix filed with the patent application on May 22, 2000 and included in the specification at pages A1–A38.

BACKGROUND OF THE INVENTION

The present invention relates generally to a method and system for generating a search result list, for example, using an Internet-based search engine. More particularly, the present invention relates to a method and system for generating search results from a pay for placement database and generating a list of related searches from a related search database.

Search engines are commonly used to search the information available on computer networks such as the World Wide Web to enable users to locate information of interest that is stored within the network. To use a search engine, a user or searcher typically enters one or more search terms that the search engine uses to generate a listing of information, such as web pages, that the searcher is then able to access and utilize. The information resulting from the search is commonly identified as a result of an association that is established between the information and one or more of the search terms entered by the user. Different search engines use different techniques to associate information with search terms and to identify related information. These search engines also use different techniques to provide the identified information to the user. Accordingly, the likelihood of information being found as a result of a search varies depending upon the search engine used to perform the search.

This uncertainty is of particular concern to web page operators that make information available on the World Wide Web. In this setting, there are often several web page operators or advertisers that are competing for the same group of potential views or customers. Accordingly, a web page's ability to be identified as the result of a search is often important to the success of a web page. Therefore, web page operators often seek to increase the likelihood that their web page will be seen as the result of a search.

One type of search engine that provides web page operators with a more predictable method of being seen as the result of a search is a "pay for placement" arrangement where web pages are displayed based at least in part upon a monetary sum that the advertiser or web page operator has agreed to pay to the search engine operator. The web page operator agrees to pay an amount of money, commonly referred to as the bid amount, in exchange for a particular position in a set of search results that is generated in response to a user's input of a search term. A higher bid amount will result in a more prominent placement in a set of search results. Thus, a web page operator may attempt to place high bids on one or more search terms to increase the likelihood that their web page will be seen as a result of a search for that term. However, there are many similar search terms, and it is difficult for a web page operator to bid on every potentially relevant search term. Likewise, it is unlikely that a bid will be made on every search term. Accordingly, a search engine operator may not receive any revenue from searches performed using certain search terms for which there are no bids.

In addition, because the number of existing web pages is ever increasing, it is becoming more difficult for a user to find relevant search results. The difficulty of obtaining relevant search results is further increased because of the search engine's dependency on the search terms entered by the user. The search results that a user receives are directly dependent upon the search terms that the user enters. The entry of one search term may not result in relevant search results, while the entry of only a slightly different search term can result in relevant search results. Accordingly, the selection of search terms is often an important part of the search process. It would be of benefit to both the searcher and the advertisers to recommend related searches for the searcher to provide to the search engine. However, current search engines do not enable a search engine operator to provide related search terms, such as those that will produce relevant search results, to a user. A system that overcomes these deficiencies is needed.

SUMMARY

By way of introduction only, in accordance with one embodiment of the invention, a search request is received from a searcher and used to perform a search on a pay for placement database. In the pay for placement database there are stored search listings including web page locators and bid amounts to be paid by the operator of the listed web page. The search using the pay for placement database produces search results which are presented to the searcher. The search request is also used to perform a search on a related search database. The related search database has been formed at least in part using contents of the pay for placement database. The search of the related search database produces a list of related searches which are presented to the searcher.

In accordance with a second embodiment, a related search database is created using a pay for placement database. All text from all web pages referenced by the pay for placement database is stored and used to create an inverted index. Additional indexes are used to improve the relevancy and spread of related search results obtained using the database.

The foregoing discussion of illustrative embodiments of the invention has been provided only by way of introduction. Nothing in this section should be taken as a limitation on the following claims, which define the scope of the invention.

DETAILED DESCRIPTION OF THE PRESENTLY PREFERRED EMBODIMENTS

Figure 1:
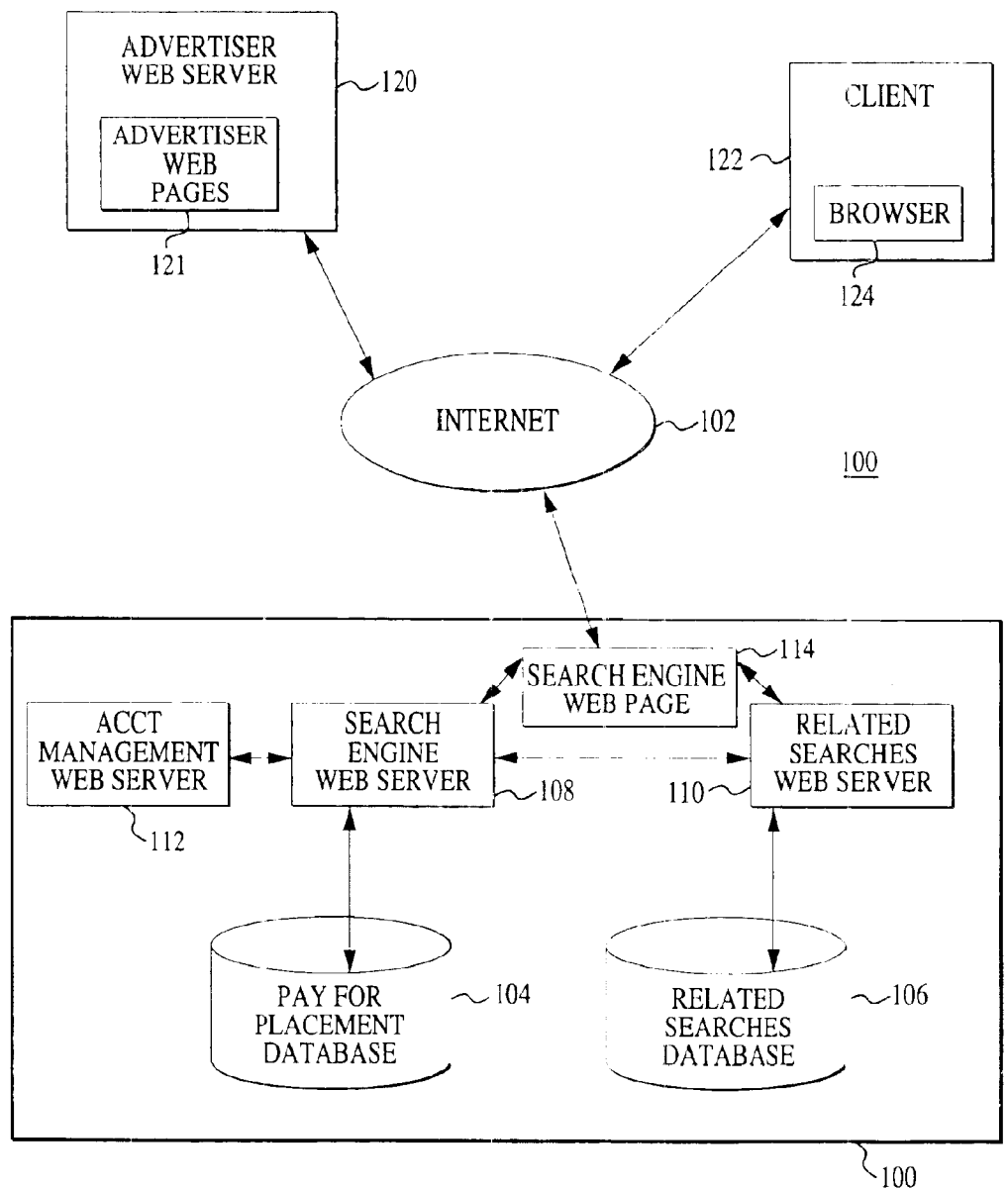
FIG. 1 is a block diagram illustrating a database search system in conjunction with a computer network.

Referring now to the drawing, FIG. 1 is a block diagram of a database search system 100 shown in conjunction with a computer network 102.

The database search system 100 includes a pay for placement database 104, a related searches database 106, a search engine web server 108, a related searches web server 110 and a search engine web page 114. The servers 104, 106, 108 may be accessed over the network 102 by an advertiser web server 120 or a client computer 122.

The network 102 in the illustrated embodiment is the Internet and provides data communication according to appropriate standards, such as Internet Protocol. In other embodiments, other network systems may be used alone or in conjunction with the Internet. Communication in the network 102 is preferably according to Internet Protocol or similar data communication standard. Other data communications standards may be used as well to ensure reliable communication of data.

The database search system 100 is configured as part of a client and server architecture. In the context of a computer network such as the Internet, a client is a process such as a program, task or application that requests a service which is provided by another process such as a program, task or application that requests a service which is provided by another process, known as a server program. The client process uses the requested service without having to know any working details about the other server program or the server itself. In networked systems, a client process usually runs on a computer that accesses shared network resources provided by another computer running a corresponding server process. A server is typically a remote computer system that is accessible over a communications medium such as a network. The server acts as an information provider for a computer network. Thus, the system 100 operates as a server for access by the clients such as client computer 122 and the advertiser web server 120.

The client computers 122 can be conventional personal computers, workstations or computer systems of any size. Each client computer 112 typically includes one or more processors, memory, input and output devices and a network interface such as a modem. The advertiser web server 120, the search engine web server 108, the related searches web server 110 and the account management web server 112 can be similarly configured. However, the advertiser web server 120, 9, the search engine web server 108, the related searches web server 110 and the account management web server 112 may each include many computers connected by a separate private network.

The client computer 112 executes a World Wide Web ("web") browser program 124. Examples of such a program are Navigator, available from Netscape Communications Corporation and Internet Explorer, available from Microsoft Corporation. The browser program 124 is used by a user to enter addresses of specific web pages to be retrieved. These addresses are referred to as Uniform Resource Locators (URLs). In addition, once a page has been retrieved, the browser program 124 can provide access to other pages or records when the user clicks on hyperlinks to other web pages contained in the web page. Such hyperlinks provide an automated way for the user to enter the URL of another page and to retrieve that page. The pages can be data records including as content plain textual information or more complex digitally encoded multimedia content such as software programs, graphics, audio data, video data and so forth.

Client computers 122 communicate through the network 102 with various network information providers. These information providers include the advertiser web server 120, the account management server 112, the search engine server 108, and the related searches web server 110. Preferably, communication functionality is provided by HyperText Transfer Protocol (HTTP), although other communication protocols such as FTP, SNMP, Telnet and a number of other protocols known in the art may be used. Preferably, search engine server 108, related searches server 110 and account management server 112, along with advertiser servers 120 are located on the worldwide web. U.S. patent application Ser. No. 09/322,627, filed May 29, 1999 and entitled "System and Method for Influencing a Position on a Search Result List Generated by a Computer Network Search Engine," and U.S. patent application Ser. No. 09/494,818, filed Jan. 31, 2000 and entitled "Method and System for Generating a Set of Search Terms," are commonly assigned to the assignee of the present application and are incorporated herein by reference. These applications disclose additional aspects of search engine systems.

The account management web server 112 in the illustrated embodiment includes a computer storage medium such as a disc system and a processing system. A database is stored on the storage medium and contains advertiser account information. Conventional browser programs 124, running on client computers 122, may be used to access advertiser account information stored on the account management server 112.

The search engine web server 108 permits network users, upon navigating to the search engine web server URL or sites on other web servers capable of submitting queries to the search engine web server 108 through a browser program 124, to type keyword queries to identify pages of interest among the millions of pages available on web pages. In one embodiment of the present invention, the search engine web server 108 generates a search result list that includes, at least in part, relevant entries obtained from and formatted by the results of the bidding process conducted by the account management server 112. The search engine web server 108 generates a list of HyperText links to documents that contain information relevant to search terms entered by the user at a client computer 122. The search engine web server transmits this list, in the form of a web page 114 to the network user, where it is displayed on the browser 124 running on the client computer 122. One embodiment of the search engine web server may be found by navigating to the web page at URL http://www.goto.com/.

Search engine web server 108 is connected to the network 102. In one embodiment of the present invention, search engine web server 108 includes a pay for placement database 104 including a plurality of search listings. The database 104 contains an ordered collection of search listing records used to generate search results in response to user queries. Each search listing record contains the URL of an associated web page or document, a title, descriptive text and a bid amount. In addition, search engine web server 108 may also be connected to the account management server 112. The account management server 112 may also be connected to the network 102.

In addition, in the illustrated embodiment of FIG. 1, the database system 100 further includes a related searches web server 110 and an associated related searches database 106.

The related searches web server 110 and data base 106 operate to provide suggested, related searches for presentation to a searcher along with search results in response to his query. Users conducting searches for information using a search engine web server such as the server 108 often perform searches which are inappropriately focused as compared to the index data of the web site search engine. Users may use search terms which are either too vague and generalized, such a "music," or too specific and focused, such as "hot jazz from New Orleans during the early 1950s." Some users require assistance to refine their query to better obtain useful information from the search engine. The related searches web server 110 provides the user with query suggestions better suited to the abilities of the pay for placement database 104.

In the illustrated embodiment, the pay for placement database 104 is established in conjunction with advertisers who operate web servers such as advertiser web server 120. Advertiser web pages 121 are displayed on the advertiser web server 120. An advertiser or web site promoter may, through an account residing on the account management server 112, participate in a competitive bidding process with other advertisers. An advertiser may bid on any number of search terms relevant to the content of the advertiser's web site.

The bids submitted by the web site promoters are used to control presentation of search results to a searcher using client computer 122. Higher bids receive more advantageous placement on a search result list generated by the search engine web server 108 when a search using the search term bid on by the advertiser is executed. In one embodiment, the amount bid by an advertiser comprises a money amount that is deducted from the account of the advertiser each time the advertiser web site is accessed via a hyperlink on the search result list page. A searcher clicks on the hyperlink with a computer input device such as a mouse to initiate a retrieval request to retrieve the information associated with the advertiser's hyperlink. Preferably, each access or click on a search result list hyperlink is redirected to the search engine web server 108 to associate the click with the account identifier for an advertiser. This redirection action, which is not apparent to the searcher, will access account information coded into the search result page before accessing the advertiser's URL using the search result list hyperlink clicked on by the searcher. In the illustrated embodiment, the advertiser's web site description and hyperlink on the search result list page is accompanied by an indication that the advertiser's listing is a paid listing. Each paid listing displays an amount corresponding to a price per click paid by the advertiser for each of referral to the advertiser site through this search result list.

The searcher may click on HyperText links associated with each listing in that search result page to access the corresponding web pages. The HyperText links may access web pages anywhere on the Internet, and include paid listings to advertiser web pages 121 located on the advertiser web server 120. In one embodiment of the present invention, the search result list also includes non-paid listings that are not priced as a result of advertiser's bids and are generated by a conventional search engine, such as the Inktomi, Lycos, or Yahoo! search engines. The non-paid HyperText links may also include links manually indexed into the pay for placement database 104 by an editorial team. Preferably, the non-paid listings follow the paid advertiser listings on the search results page.

Related searches web server 110 receives the search request from the searcher at client computer 122 as entered using the search engine web page 114. In the related searches database 106, which includes related search listings generated from the pay for placement database 104, the related searches web server 110 identifies related search listings relevant to the search request. In conjunction with the search engine web server 108, the related searches web server 110 returns a search result list to the searcher including the identified search listings located in the pay for placement database and one or more identified related search listings located in the related searches database 106. Operation of the related searches web server 110 in conjunction with the related searches database 106 will be described below in conjunction with FIGS. 2–5. The formation of the related searches database 106 will be described below in conjunction with FIG. 6.

Figure 2:
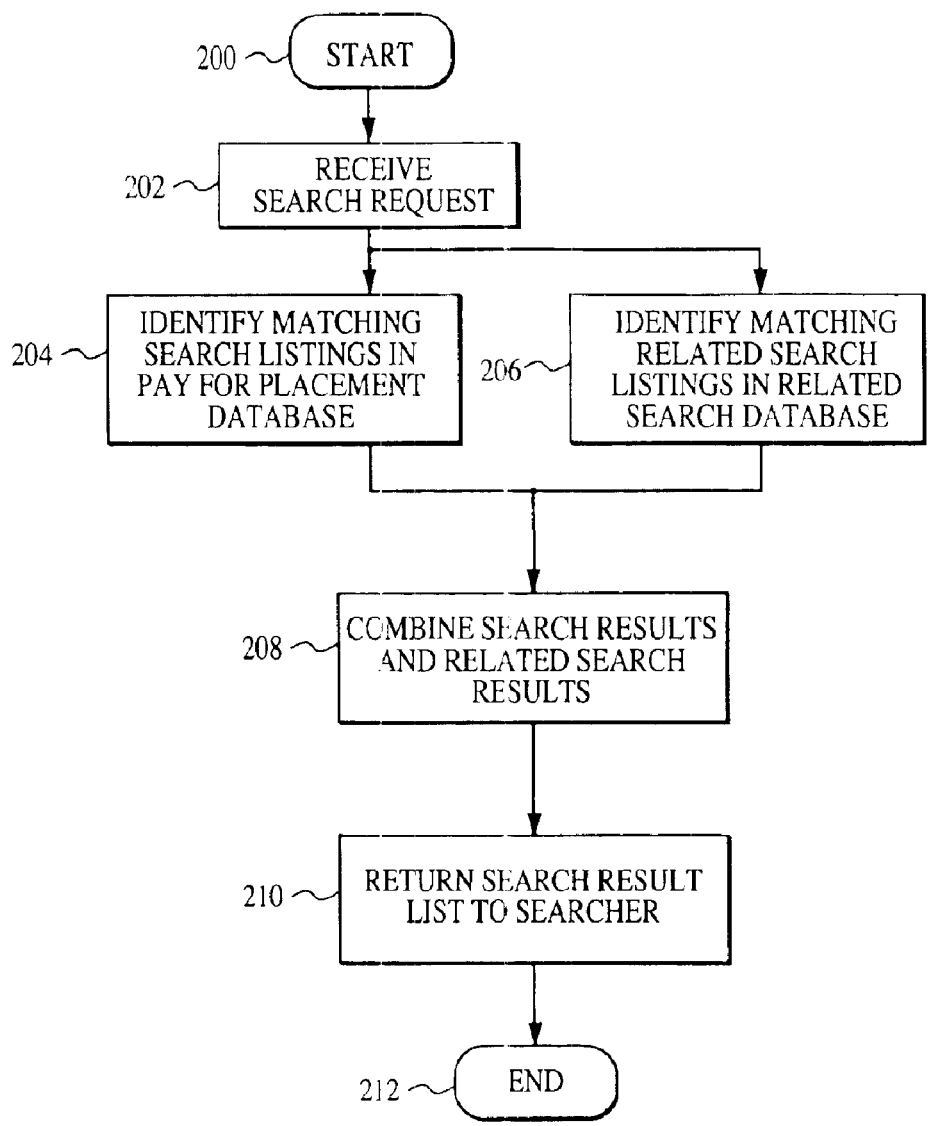
FIG. 2 is a flow diagram illustrating a method for operating the database search system of FIG. 1.

FIG. 2 is a flow diagram illustrating a method for operating the database search system 100 of FIG. 1. The method begins at block 200. JAVA® programming language source code for implementing the method of FIG. 2 and other method steps described herein is included as an appendix.

At block 202, a search request is received. The search request may be received in any suitable manner. It is envisioned that a search request will originate with a searcher using a client computer to access the search engine web page of the database system implementing the method illustrated in FIG. 2. A search request may be typed in as input text in a hyperlink click to initiate the search request and search process.

After block 202, two parallel processes are initiated. At block 204, the search engine web server of the database search system identifies matching search listings in the pay for placement database of the system. In addition, the search engine web server may further identify non-paid search listings.

Similarly, at block 206, a related searches web server initiates a search to identify matching related search listings in the related search database. By matching search listings, it is meant that the respective search engine identifies search listings contained in the respective database which generate a match with the search request. A match may be generated if an exact, letter for letter textual match occurs between a bid on keyword and a search term. In other embodiments, a match may be generated if a bidded keyword has a predetermined relationship with a search term. For example, the predetermined relationship may include matching the root of a word which has been stripped of suffixes; in a multiple word query, matching several but not all of the words; or locating the multiple words of the query with a predetermined number of words of proximity.

After the search results have been located, the search results from the pay for placement database are combined with search results from the related search database, block 208. At block 210, a search result list is returned to the searcher, for example by displaying identified search listings on the search engine web page and conveying the web page data over the network to the client computer. The search results and related search results may be displayed in any convenient fashion.

Figure 3A:
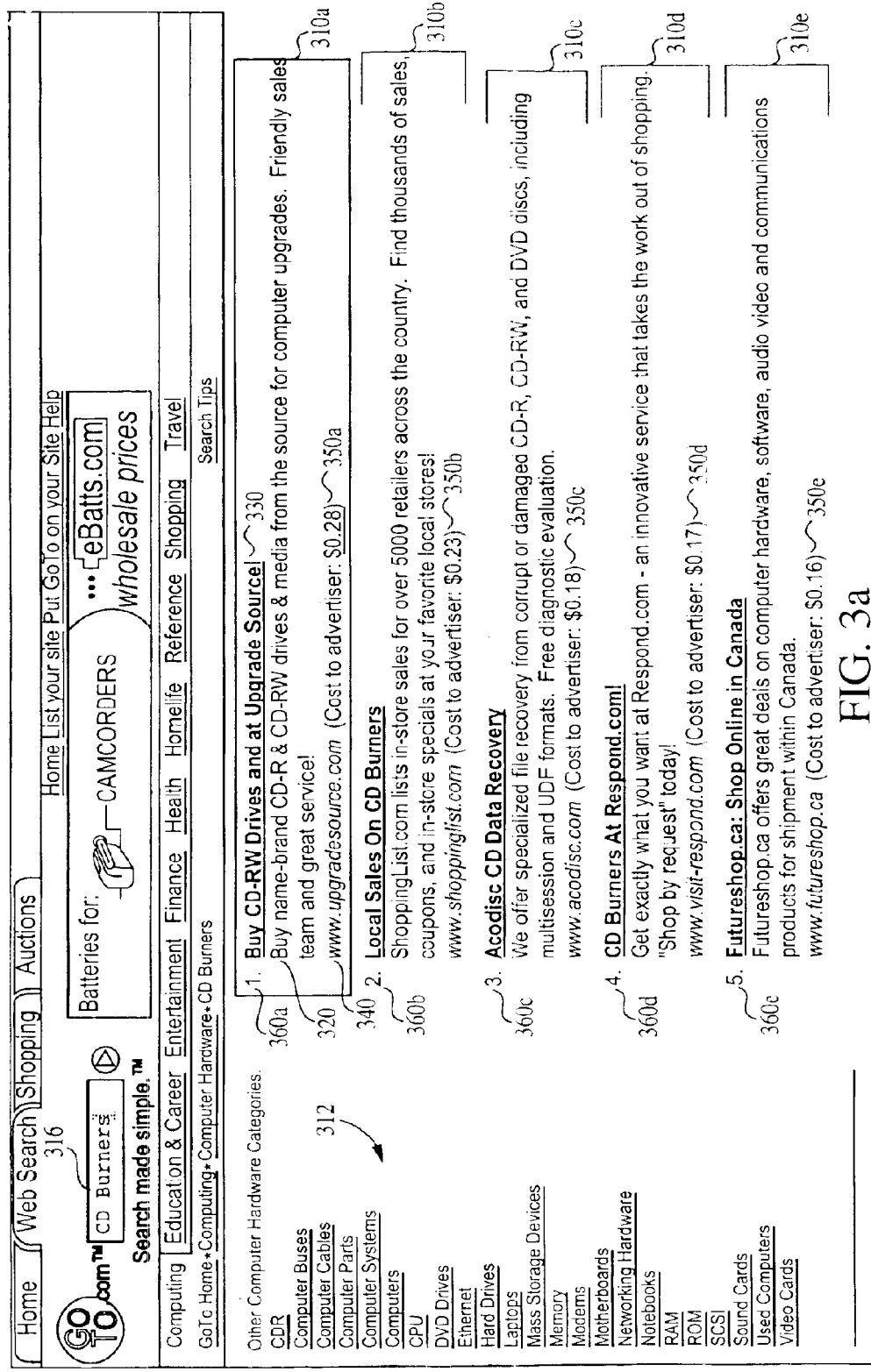
FIG. 3 is a flow diagram illustrating a method for operating the database search system of FIG. 1.
Figure 3B:
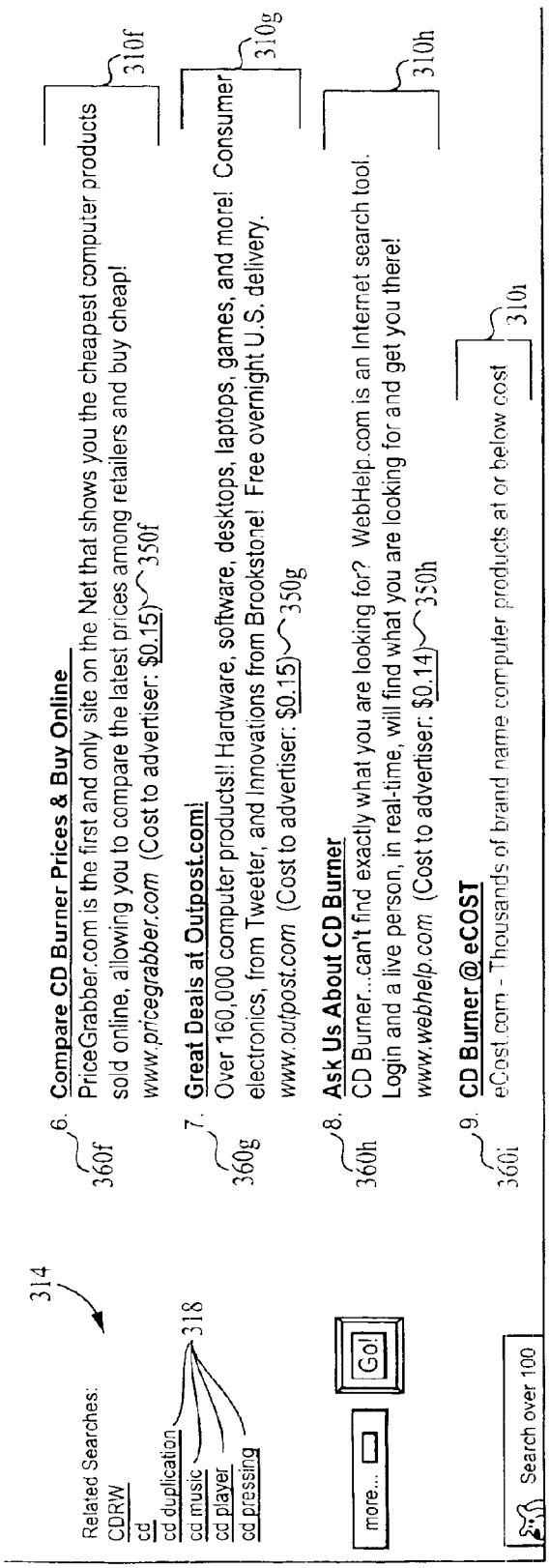

An example of a search result list display used in one embodiment of the present invention is shown in FIG. 3, which is a display of the first several entries resulting from the search for the term "CD burners." The exemplary display of FIG. 3 shows a portion of a search result list including a plurality of entries 310a, 310b, 310c, 310d, 310e, 310f, 310g, 310h, 310i, a listing 312 of other search categories and a related searches listing 314.

As shown in FIG. 3, a single entry, such as entry 310a in the search result list consists of a description 320 of the web site, preferably comprising a title and a short textual description, and a hyperlink 330 which, when clicked by a searcher, directs the searcher browser to the URL where the described web site is located. The URL 340 may also be displayed in the search result list entry 310a, as shown in FIG. 3. The "click through" of a search result item occurs when the remote searcher viewing the search result item display 310 of FIG. 3 selects or clicks on the hyperlink 330 of the search result item display 310.

Search result list entries 310a–310h may also show the rank value 360a, 360b, 360c, 360d, 360e, 360f, 360g, 360h, 360i of the advertisers' search listing. The rank value 360a–360i is an ordinal value, preferably a number, generated and assigned to the search listing by the processing system of the search engine web server. Preferably, the rank value 360a–360i is assigned in a process, implemented in software, that establishes an association between the bid amount, the rank, and the search term of a search listing. The process gathers all search listings that match a particular search term, sorts the search listings in order from highest to lowest bid amount, and assigns a rank value to each search listing in order. The highest bid amount receives the highest rank value, the next highest bid amount receives the next highest rank value, proceeding to the lowest bid amount, which receives the lowest rank value. The correlation between rank value and bid amount is illustrated in FIG. 3, where each of the paid search list entries 310a–310h display the advertiser's bid amount 350a, 350b, 350c, 350d, 350e, 350f, 350g, 350h, 350i for that entry. If two search listings having the same search term also have the same bid amount, the bid that was received earlier in a, time will be assigned the higher rank of value.

The search result list of FIG. 3 does not include unpaid listings. In the preferred embodiment, unpaid listings do not display a bid amount and are displayed following the lowest ranked paid listing. Unpaid listings are generated by a search engine utilizing object distributed database and text searching algorithms as known in the art. An example of such a search engine is the search engine operated by Inktomi Corporation. The original search query entered by the remote searcher is used to generate unpaid listings through the conventional search engine.

The listing 312 of other search categories shows other possible categories for searching that may be related to the searcher's input search term 316. The other search categories are selected for display by identifying a group such as computer hardware containing the input search term 316. Categories with in the group are then displayed as hyperlinks which may be clicked through by the searcher for additional searches. This enhances the user's convenience in cases where the user's input search did not turn up suitable search results.

The related searches listing 314 displays six entries 318 of related searches determined using the related searches database as described herein. In other embodiments, other numbers of related search entries may be show. In addition, a link 320 labeled "more" allows the user to display additional related search entries. In the illustrated embodiment, the displayed entries 318 are the top six most relevant and most bidded-on terms in the related searches database.

Figure 4:
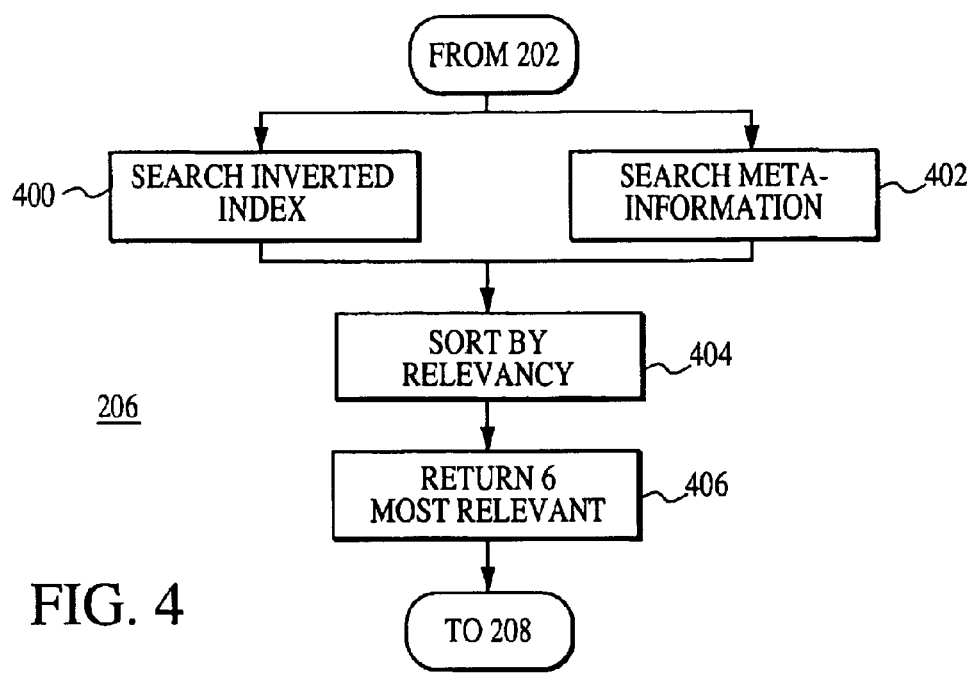
FIG. 4 is a flow diagram illustrating in more detail a portion of the method shown in FIG. 2.

Referring now to FIG. 4, the act of identifying matching related search listings in a related search database (act 206, FIG. 2) in one embodiment comprises the following acts. At block 400, an inverted index containing all data from all web pages contained in the pay for placement database of the database search system is searched. The inverted index is stored in the related searches database. In an inverted index, a single index entry is used to reference many database records. Searching for multiple matches per index entry is generally faster when using inverted indexes, since each index entry may reference many database records. The inverted index lists the words which can be searched in, for example, alphabetical order and accompanying each word are pointers which identify the particular documents which contain the word as well as the locations within each document at which the word occurs. To perform a search, instead of searching through the documents in word order, the computer locates the pointers for the particular words identified in a search query and processes them. The computer identifies the documents which have the required order and proximity relationship for the search query terms.

At block 402, meta-information is also searched for the received search term. Meta-information is abstracted, once-removed information about the collected data itself and forms a description of the data. Meta-information is derived information and relational information. Meta-information for a listing describes the relation of the listing to other listings, and meta-information for a listing describes the relation of the advertisers sponsoring a listing to other advertisers.

Meta-information is obtained using a script of command to analyze the pay for placement data base and determine information and relationships present in the data. The meta-information is collected for each row of data in the database and attached to that row. In one embodiment, the script is run one time as a batch process after the data is collected in the database. In other embodiments, the script is periodically re-run to update the meta-information.

Meta-information about the web pages and key words contained in the pay for placement database includes information such as the frequency of occurrence of similar key words among different web site domains and the number of different key words associated with a single web site. The meta-information may further include fielded advertiser data which is the information contained in each search listing provided by web site promoters who have bid upon search terms in the pay for placement database; advertiser identification information; web site themes, such as gambling or adult content; and derived themes. Preferably, the meta-information is combined in a common inverted index with the stored web page data searched at block 400.

The result of the searches of block 400 and block 402 is a listing of rows of the inverted index or indexes containing the searched information. Each row contains the information associated with a search listing of the pay for placement database along with all the text of the web page associated with the search listing. In the illustrated embodiment, the search listing includes the advertiser's search terms, the URL of the web page, a title and descriptive text.

At block 404, the returned related search results are sorted by relevancy. Any suitable sorting routine may be used. A preferred process of sorting the search results by relevancy, block 404, is illustrated in greater detail in FIG. 5.

At block 406, the six most relevant related search results are selected. It is to be noted that any suitable number of search results may be provided. The choice of providing six related searches as suggestions to a searcher is arbitrary. After block 406, control proceeds at block 208, FIG. 2.

Figure 5:
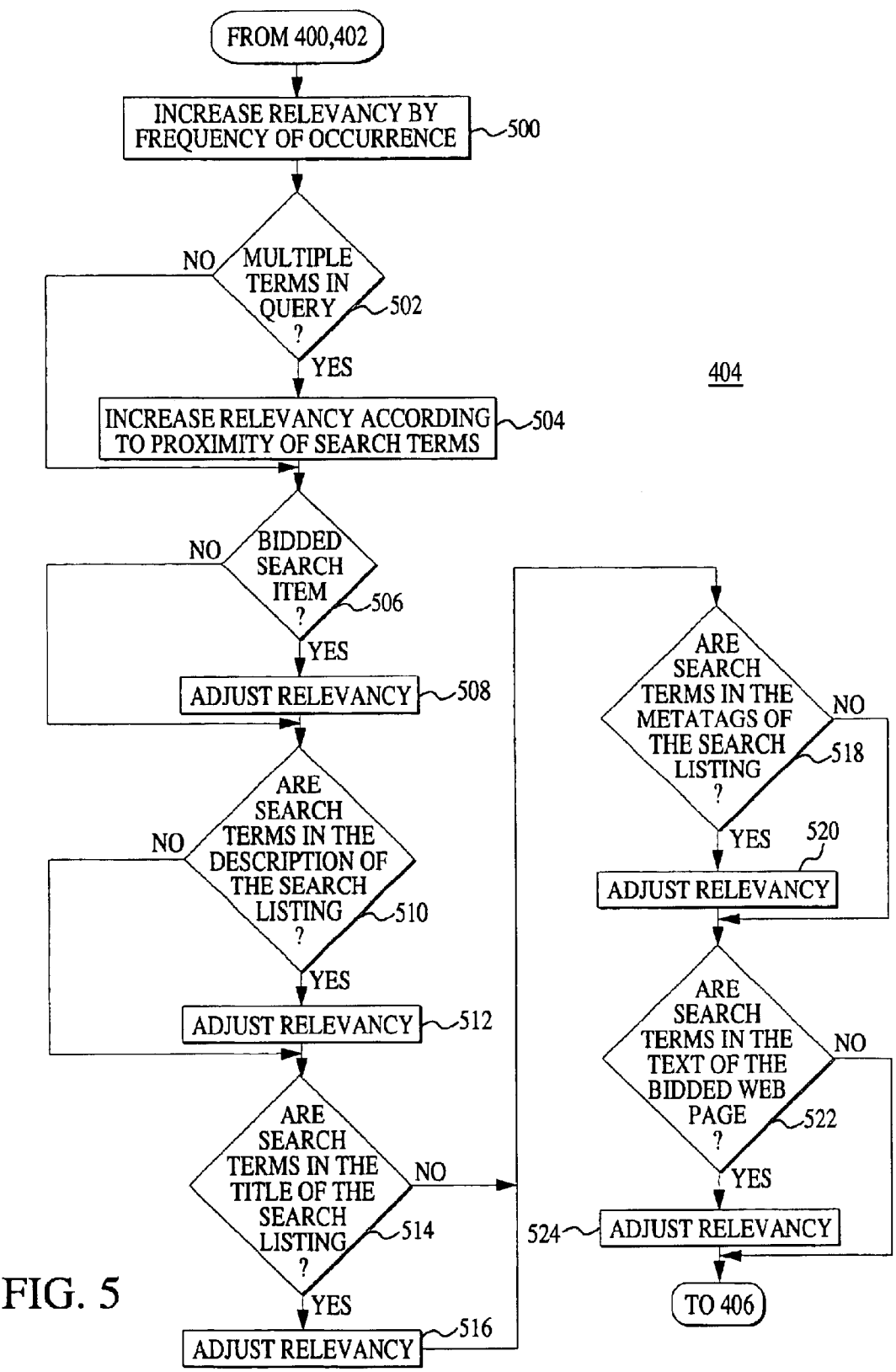
FIG. 5 is a flow diagram illustrating in more detail a portion of the method shown in FIG. 2.

FIG. 5 is a flow diagram illustrating a method for sorting by relevancy search results obtained from a related searches database, corresponding to block 404 of FIG. 4. In the embodiment illustrated in FIG. 5, a relevancy value is maintained for each returned listing. The relevancy value is adjusted according to specific relevancy factors, some of which are defined in FIG. 5. Other relevancy factors may be used as well. After adjusting the relevancy value, a final sorting occurs and the highest valued listings are returned.

At block 500, the relevancy value for individual records located during the search (block 400, block 402, FIG. 4) are increased according to the frequency of occurrence of a queried search term in each respective record. For example, if the queried search term occurs frequently in the text associated with the search listing, the relevancy of that listing is increased. If the queried search term occurs rarely or not at all in the listing, the relevancy value of that list is not increased or is decreased.

At block 502, it is determined if there are multiple search terms in the search queries submitted by the searcher. If not, control proceeds to block 506. If there are multiple search terms, at block 504, the relevancy of individual search results is increased according to proximity of the searched terms in a located record. Thus, if two search terms are immediately proximate, the relevancy score value for the record may be substantially increased, suggesting that the identified search listing is highly relevant to the search query submitted by the searcher. On the other hand, if the two search terms occur, for example, in the same sentence but not in close proximity, the relevancy of the record may be slightly increased to indicate the lesser relevancy suggested by the reduced proximity of the search terms.

At block 506, it is determined if the located record contains a bidded search term. Search terms are bidded on by advertisers, the bids being used for display of search results by the search engine web server using the pay for placement database. If the search result does include a bidded on search term, the relevancy of the record is adjusted, block 508. If the query does not include one or more bided on search terms, control proceeds to block 510.

At block 510, it is determined if there are search terms in the description of the search listing. As illustrated in FIG. 3, each such listing includes a textural description of the contents of the web site associated with the search listing. If the search terms are not included in the description, control proceeds to block 514. If the search terms are included in the description, at block 512, the relevancy of the located record is adjusted accordingly.

At block 514, it is determined if the search terms are located in the title of the search listing. As illustrated in FIG. 3, each search listing includes a title 360. If the search terms are included in the title of a record, the relevancy of the record is adjusted accordingly, block 516. If the search terms are not included in the title, control proceeds to block 518.

At block 518, it is determined if the search terms are included in the metatags of the search listing. Metatags are textural information included in a web site which is not displayed for user use. However, the search listing contained in the pay for placement database includes the metatags for searching and other purposes. If, at block 518, the search terms are not included in the search listing, control proceeds to block 522. On the other hand, if the search terms are included in one or more metatags of the search listing, at block 520 the relevancy of the record is adjusted accordingly.

At block 522 it is determined if the user's search terms are included in the text of the bided web page. If not, control proceeds to block 406, FIG. 4. However, if the search terms are included in the web page text, at block 524 the relevancy of the search listing record is adjusted accordingly.

Following the steps illustrated in FIG. 5, one or more and preferably six most relevant related search listings are returned and presented to the searcher along with the search results from the pay for placement database.

Figure 6:
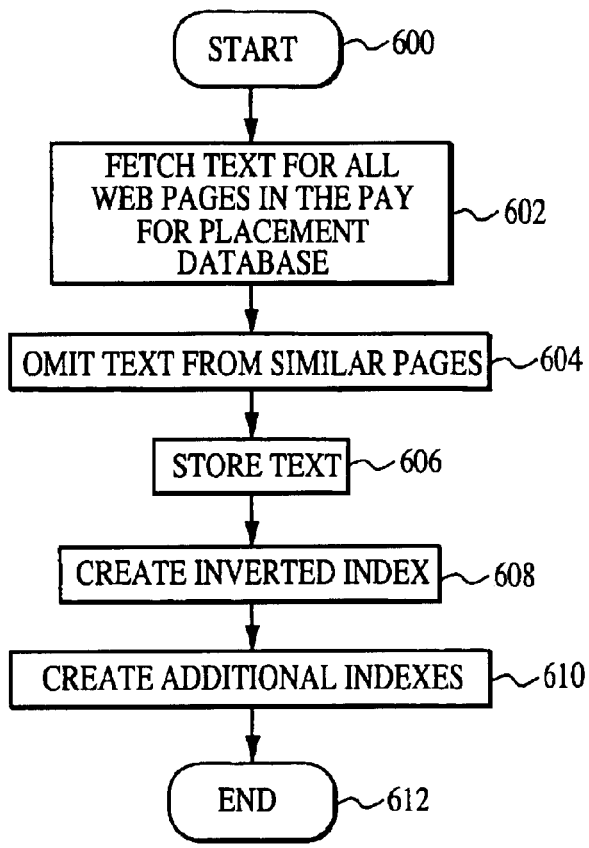
FIG. 6 is a flow diagram illustrating a method for forming a related searches database.

FIG. 6 illustrates a method for forming a related searches database for use in the database search system of FIG. 1. The method begins at block 600.

At block 602, all text for all web pages in the pay for placement database is fetched. This includes metatags and other non-displayed textual information contained in the web page referenced by a URL contained in the pay for performance database. At block 604, text from similar pages is omitted. This reduces the amount of data which must be processed to form the related searches database. One embodiment of a method for performing this act will be described below in conjunction with FIG. 7. In addition, this greatly increases the speed at which the related searches database may be produced. At block 606, the text is stored in the related searches database.

At block 608, an inverted index is created, indexing the search listing data stored at block 606 along with the text fetched at block 602. The resulting inverting index includes a plurality of rows of data, each row including a key word along with all text from the database associated with that key word.

One illustrative example of a configuration for the contents of the related search database follows. Each row of the database includes the following elements:

| | | |
|---|---|---|
| canon_cnt | integer | # Number of different search listings bidded on this related result |
| advertiser_cnt | integer | # Number of different advertisers bidding on this related result |
| related_result | varchar(50) | # related result (bidded search term), canonicalized and depluralized |
| raw_search_text | varchar(50) | # original raw bidded search term |
| advertiser_ids | varchar(4096) | # explicit list of all advertisers bidding on this related result |
| words | varchar(65536+) | # full text of all web pages crawled, including hand-coded descriptions |
| theme | varchar(50) | |
| directory_taxonomy | varchar(200) | |

The count canon_cnt differs from the count advertiser_cnt because many different web pages in the same domain could be bidded against the same bidded search term, or many different advertisers may bid on only 1 search term. Special themed keys are embedded into the database with 'flags' inserted in the advertiser_ent field. If 'advertiser_cnt==999999999', the query being presented is an adult-oriented query. In this implementation, an optional enhancement is to disable related results in this case. The counts canon_cnt and advertiser_cnt are the current derived-data fields. Additional fields such as theme and directory taxonomy category can optionally be added to give even more enhanced relevance to related results matches, though they are not used in the illustrated embodiment.

In one embodiment, the inverted index which is queried against to obtain the related results is created with the following JAVA® programming language command:

SQL>Create metamorph inverted index mm_index02 on line_ad02(words);

This is the vendor-specific method (using the Texis relational database management system provide by Thunderstone-EPI, Inc.) for creating a free-text search index (mm_index02) on a document (here contained in a database column (words)) which will be searched (from RelatedSearcherCore.java) by the Texis Thunderstone SQL command:

"SELECT"
+"$rank,"//Num getRow( ) arg position 0
+"canon_cnt," //Int getRow( ) arg position 1
+"raw_search_text," //Stri getRow( ) arg position 2
+"cannon_search_text," //Stri getRow( ) arg position 3
+"advertiser_ids," //Stri getRow( ) arg position 4
+"advertiser_cnt" //Int getrow( ) arg position 5
+"FROM line_ad02"
+"WHERE words"
+"LIKEP $query ORDER BY 1 desc, advertiser_cnt desc;";

The $rank is a vendor-supplied virtual data field which programmatically contains the "relevancy" of the search result, based on the frequency of occurrence of the queried phrase ($query) in the "words" field, the proximity of the queried phrase elements to each other within the indexed words field, and the word order (if>1 query phrase word) as compared to the ordering of words within the "words" field.

The "rank" is vendor-specific, and derived by various differing algorithms by different Free Text Search Engine suppliers, though is similar enough in practice that any vendor's Free Text Search Engine works to implement the Related Searches Functionality.

The "ORDER BY 1 desc[ending], advertiser_cnt desc [ending]" controls ranking the results of the query by relevance primarily (field "1"==$rank), and secondarily by the derived field "advertiser_cnt", which is the count of advertisers bidding on this particular related_search_result. Thus, "relevance" is the primary selection criteria, and "popularity" is the secondary selection criteria.

At block 610, additional indexes are created and stored with the inverted index created at block 608. The additional indexes are created using key information associated with each search listing. The key information includes, for example, fielded advertiser data such as an advertiser's identification and derived themes such as gambling and so forth. The method then ends at block 612.

Figure 7:
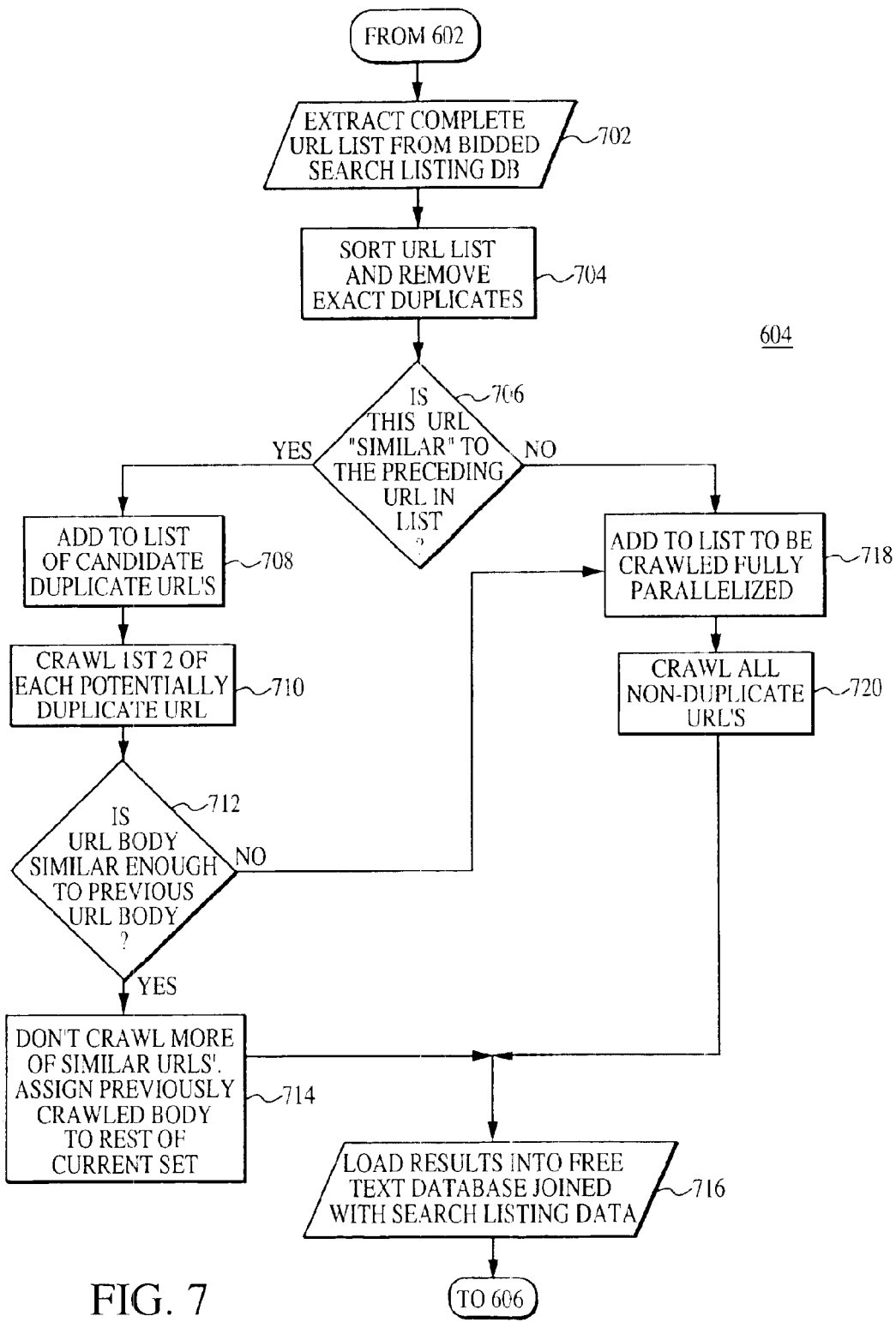
FIG. 7 is a flow diagram illustrating a method for removing similar page information from a database.

FIG. 7 is a flow diagram illustrating a method for removing similar page information from a database. The method in the illustrated implementation follows performance of act 602 of FIG. 6.

At block 702, the pay for placement database (also referred to as a bidded search listing data base) is examined for URL data and all URLs are extracted from the database and formed into a list. The list is sorted and any exact duplicates are removed, block 704.

At block 706, a URL in the list is selected and it is determined if the selected URL bears similarity to a preceding URL in the list. Similarity may be determined by any suitable method, such as a number of identical characters or fields within the URL or a percentage of identical characters, or a common root or string or field.

At block 708, if the selected URL is similar to the preceding URL, the selected URL is added to a list of candidate duplicate URLs. At block 710, a predetermined number of each potentially duplicate URL are crawled. In the illustrated embodiment, the predetermined number is the first two potentially duplicate URLs. Crawling is preferably accomplished using a program code referred to as a crawler.

A crawler is a program that visits Web sites and reads their pages and other information. Such programs are will known and are also known as a "spiders" or "bots." Entire sites or specific pages can be selectively visited and indexed by a crawler. In alternative embodiments, subsets of each site referenced by a URL, rather than an entire site, may be crawled and compared for similarity.

At block 712, the data returned by the crawler is examined. The data may be referred to as the body of the URL and includes data from the site identified by the URL and all accessible pages of the site. It is determined if the data including text and other information contained in the body of the URL is sufficiently similar to the data contained in the body of the previous URL. Again, similarity may be determined by any suitable method, such as a statistical comparison of the textual content of each page. If there is sufficient similarity, control proceeds to block 714 and it is assumed that the URL is the same as the previous URL. The body of text and other information is assigned to the rest of the similar URLs.

If, at block 706, it was determined that the selected URL was not similar to the preceding URL, or if at block 712 it was determined that the body of the URL was not similar enough to the body of the previous URL, control proceeds to block 718. At block 718, the URL is added to a list of URLs to be crawled. At block 720, all URLs on the list are crawled to retrieve and store information contained at the sites indicated by each URL.

At block 716, the information from each crawled URL is loaded into the related searches database (also referred to as the free text database). The information is joined with search listing data already included in the related searches database. Thus, the method steps illustrated in FIG. 7 reduce the total amount of data contained in the related searches database by reducing the number of URLs that are crawled and stored. Duplicate URLs are eliminated from the process and near-duplicate URLs are checked for similarity of content. The result is reduced storage requirements for the resulting database and faster, more efficient searching on the database. This enhances user convenience by improving performance.

From the foregoing, it can be seen that the present invention provides an improved method and apparatus for producing related searches for presentation to a searcher searching in a pay for placement database. Related searches are performed in a related searches database which has been formed using the pay for placement database. The search results from the related searcher's database are ordered by relevancy for presentation to the user. Thus, if a user's initial search was too narrow or too broad, the user has available related searches which may be used to produce more usable results. In addition, the related searches have been produced using search listings referenced by bidded search terms. This provides a benefit to advertisers who pay for advertising in the database search system. This increases the likelihood that an advertiser's web site will be visited by a searcher using the database system.

While a particular embodiment of the present invention has been shown and described, modifications may be made. It is therefore intended in the appended claims to cover all such changes and modifications which fall within the true spirit and scope of the invention.

What is claimed is:

1. A computer network search engine apparatus comprising:
    a search database having stored therein a plurality of search listings, each listing being associated with an information provider, at least one keyword, a money amount, and a computer network location;
    an input device for receiving a keyword entered by a user;
    a search engine web server for identifying search listings of the search database having a keyword matching the keyword entered by the user, ordering the identified search listings using the money amounts for the respective identified search listings, and generating a result list including at least some of the ordered listings;

a related searches database having stored thereon related searches listings formed using search listings of the search database, the related searches listings each including a key word and text from the search database associated with the key word;

a related searches web server for identifying related searches listings matching the keyword entered by the user and producing a related searches result list with suggested, related searches for presentation to the user along with the result list;

an output device for providing the result list and the related search result list to the user, and recording means for recording a request from the user to retrieve information associated with a listing selected from the result list, including account identification information for charging to an account of the information provider associated with the selected listing the money amount associated with the selected listing.

2. The computer network search engine apparatus of claim 1 wherein the related searches database has stored thereon an inverted index including a plurality of rows of data, each row including a key word, data defining the number of search listings of the search database bidded on the key word and data defining search listings of the search database bidding on the key word.

3. The computer network search engine apparatus of claim 2 wherein each row of the inverted index further includes raw text defining the key word and a list of all information providers bidding on the key word.

4. The computer network search engine apparatus of claim 1 wherein the input device comprises a search engine web page displayable on a client computer of the user.

5. The computer network search engine apparatus of claim 1 wherein the output device comprises a search engine web page displayable on a client computer of the user, the search engine web page including a first area displaying a portion of the result list and a second are displaying a portion of the related search result list.

6. The computer network search engine apparatus of claim 5 wherein the portion of the related search result list is displayed on the search engine web page as a plurality of clickable links, each clickable link being associated with a related search result listing.

7. The computer network search engine apparatus of claim 1 wherein the related searches web server is configured to weight the related searches listings according to predetermined weighting criteria and order the a related searches result list according to the weighting of the related searches listings.

8. The computer network search engine apparatus of claim 7 wherein the related searches web server is configured to weight the related searches listings according to at least one of increasing relative weighting of the related searches listing which includes one or more bidded search terms identified by an information provider, increasing the relative weighting of the related searches listing which is contained in a description of a search listing identified by an information provider, increasing relative weighting of a related searches listing which is contained in a title of a search listing identified by an information provider, increasing relative weighting of a related searches listing which is contained in metatag keywords of a web page maintained by an information provider, and increasing relative weighting of a related searches listing which is contained in text data of a web page maintained by an information provider.

9. A database search system comprising:

a search database having stored therein a plurality of search listings each listing being associated with an information provider, at least one keyword, a money amount, and a computer network location;

a search engine web server accessible over a network by an advertiser web server and a client computer and configured to receive search queries from the client computer and, in response thereto, to provide to the client computer a search result list including relevant entries located in the search database using the received search queries and ordered using the money amounts for the respective entries;

a related searches database having stored thereon related search listings generated from the search database;

a related searches database accessible over a network by an advertiser web server and a client computer, and configured to receive the search queries from the client computer and, in response thereto, to provide to the client computer, along with the search result list, entries for one or more related search listings located in the related searches database using the received search queries; and an account management server configured to store account information for advertisers including the information provider.

10. The database search system of claim 9 wherein the one or more related search listings comprise a predetermined number of most relevant and most bidded-on terms in the related searches database as determined by the related searches web server.

11. The database search system of claim 9 wherein the entries for the one or more related search listings are displayed as clickable links adjacent to the search result list on a search engine web page.

12. The database search system of claim 9 wherein the related searches web server is configured:

to receive a search query and, in response to the received search query, to search an inverted index stored in the related searches database and containing data from web pages referenced by the search database, and to identify index entries matching the received search query.

13. The database search system of claim 12 wherein the related searches web server is further configured:

in response to the search query, to search meta-information about the web pages referenced by the search database, the meta-information being stored in the related searches database, and to identify index entries of meta-information matching the received search query.

14. The database search system of claim 13 wherein the related searches web server is further configured:

to sort the identified index entries and the identified index entries of meta-information by relevance, and to provide a predetermined number of most relevant entries as the entries for one or more related search listings.

* * * * *